United States Patent
Shinmura et al.

(10) Patent No.: US 7,490,645 B2
(45) Date of Patent: Feb. 17, 2009

(54) PNEUMATIC TIRE WITH TREAD HAVING SIPE IN TIE BAR

(75) Inventors: Yasushi Shinmura, Kobe (JP); Hideaki Sugihara, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 72 days.

(21) Appl. No.: 11/084,235

(22) Filed: Mar. 21, 2005

(65) Prior Publication Data

US 2005/0211354 A1 Sep. 29, 2005

(30) Foreign Application Priority Data

Mar. 25, 2004 (JP) .............................. 2004-089814

(51) Int. Cl.
*B60C 11/12* (2006.01)
*B60C 11/13* (2006.01)
(52) U.S. Cl. ............................ 152/209.21; 152/209.22; 152/209.23; 152/DIG. 3; 152/902
(58) Field of Classification Search ............ 152/209.21, 152/209.22, 209.23, DIG. 3, 902
See application file for complete search history.

(56) References Cited

U.S. PATENT DOCUMENTS

| | | | | |
|---|---|---|---|---|
| 4,217,942 A | * | 8/1980 | Takigawa et al. ........ | 152/209.21 |
| 5,350,001 A | * | 9/1994 | Beckmann et al. ...... | 152/DIG. 3 |
| 5,783,002 A | * | 7/1998 | Lagnier .................. | 152/DIG. 3 |
| 6,481,480 B1 | * | 11/2002 | Schuster et al. ........ | 152/209.22 |
| 2003/0029537 A1 | * | 2/2003 | Iwamura ................. | 152/209.18 |
| 2004/0134579 A1 | * | 7/2004 | Tanaka .................... | 152/209.1 |
| 2005/0121124 A1 | * | 6/2005 | Tsubono ................. | 152/209.18 |
| 2005/0150581 A1 | * | 7/2005 | Kishida .................. | 152/209.18 |
| 2006/0086445 A1 | * | 4/2006 | Kishida .................. | 152/209.18 |

FOREIGN PATENT DOCUMENTS

| | | | |
|---|---|---|---|
| JP | 10-035223 | * | 2/1998 |
| JP | 11-278016 A | | 10/1999 |
| JP | 2001-187517 | * | 7/2001 |
| JP | 2002-321509 | * | 11/2002 |
| JP | 2003-25812 A | | 1/2003 |

OTHER PUBLICATIONS

Machine translation for Japan 11-278016, Dec. 15, 2006.*

* cited by examiner

*Primary Examiner*—Steven D Maki
(74) *Attorney, Agent, or Firm*—Birch, Stewart, Kolasch & Birch, LLP

(57) ABSTRACT

A pneumatic tire which includes a tie bar in a lateral groove disposed in a block array, the tie bar connecting adjacent blocks in a circumferential direction through the lateral groove. The tie bar is formed with a sipeing having a zigzag portion, the zigzag portion extending in a zigzag manner in a direction of a groove centerline of the lateral groove. The sipeing is a three-dimensional sipeing in which a sipeing wall surface is repeatedly recessed and projected, three-dimensionally.

10 Claims, 8 Drawing Sheets

PNEUMATIC TIRE WITH TREAD HAVING SIPE IN TIE BAR

BACKGROUND OF THE INVENTION

1. Field of the Invention

The present invention relates to a pneumatic tire in which a tie bar is provided with a sipeing to enhance on-snow performance and wet performance from middle stage of wear while securing uneven-wear resistance.

2. Description of the Related Art

In a tire such as an all-season tire and snow tire, there is employed a block pattern in which a tread portion is divided into a plurality of blocks by tread grooves including circumferential main grooves extending in the circumferential direction of the tire and lateral grooves intersecting with the circumferential main grooves while taking on-snow performance and wet performance into consideration. At that time, if a tread groove is formed deeply and widely, the performance such as the on-snow performance can highly be secured. On the other hand, the block rigidity is deteriorated, and uneven wear such as heel and toe wear is prone to be generated.

Japanese Patent Application Laid-open No.H11-278016 proposes that the lateral groove is provided with a tie bar which bulges from a bottom surface of the lateral groove, blocks which are adjacent to each other in the circumferential direction of the tire are connected to each other through the tie bar, and the tie bar is formed with a sipeing in a direction of the lateral groove. According to this proposal, since the rigidity of the block in its circumferential direction is enhanced by the tie bar and thus, the uneven wear can be suppressed. The sipeing is exposed from the tread surface from the middle stage of wear, and edge effect is exhibited. Thus, there is a merit that deterioration of the on-snow performance and wet performance caused by the tie bar can be complemented.

However, in a normal sipeing, although the wall surfaces support each other against the force in the circumferential direction of the tire and thus the block rigidity can highly be secured, the wall surfaces can not support each other against the lateral force, and large distortion is generated in the bottom of the sipeing. If the distortion is repeatedly generated, the crack is prone to be generated in the sipeing bottom, and there is a tendency that block becomes cracked.

SUMMARY OF THE INVENTION

Thereupon, it is an object of the present invention to provide a pneumatic tire in which a tie bar is provided with a three-dimensional sipeing in which sipeing wall surface is repeatedly recessed and projected three-dimensionally, excellent uneven wear resistance can be exhibited, on-snow performance and wet performance can highly be secured from the middle stage of wear, and crack can be prevented from being generated from the sipeing bottom.

To achieve the object, an invention of claim 1 of this application provides a pneumatic tire comprising a tread portion, and a plurality of rib-like land portions divided by circumferential main grooves extending in a circumferential direction of the tire, in which at least one rib-like land portion is divided into a plurality of blocks arranged in the circumferential direction by lateral grooves which cut across the rib-like land portion, wherein the lateral groove includes a tie bar which bulges from a bottom surface of the lateral groove and which connects circumferentially adjacent blocks to each other, the tie bar is formed with a sipeing which opens at an outer surface of the tie bar and which comprises a zigzag portion extending in a direction of a groove centerline of the lateral groove in a zigzag manner, and the sipeing comprises a three-dimensional sipeing whose wall surface is repeatedly recessed and projected three-dimensionally.

According to the present invention, an outer surface of the tie bar is formed with the three-dimensional sipeing in which the sipeing wall surface is repeatedly recessed and projected three-dimensionally. In the three-dimensional sipeing, since opposed sipeing wall surfaces mesh with each other at projections and depressions to support each other, high resistant force not only against the force in the circumferential direction but also against the lateral force. Therefore, it is possible to suppress the generation of crack in the sipeing bottom while highly securing the uneven-wear resistance, as well as on-snow performance and wet performance from the middle stage of wear.

DESCRIPTION OF THE PREFERRED EMBODIMENTS

Figure 1:
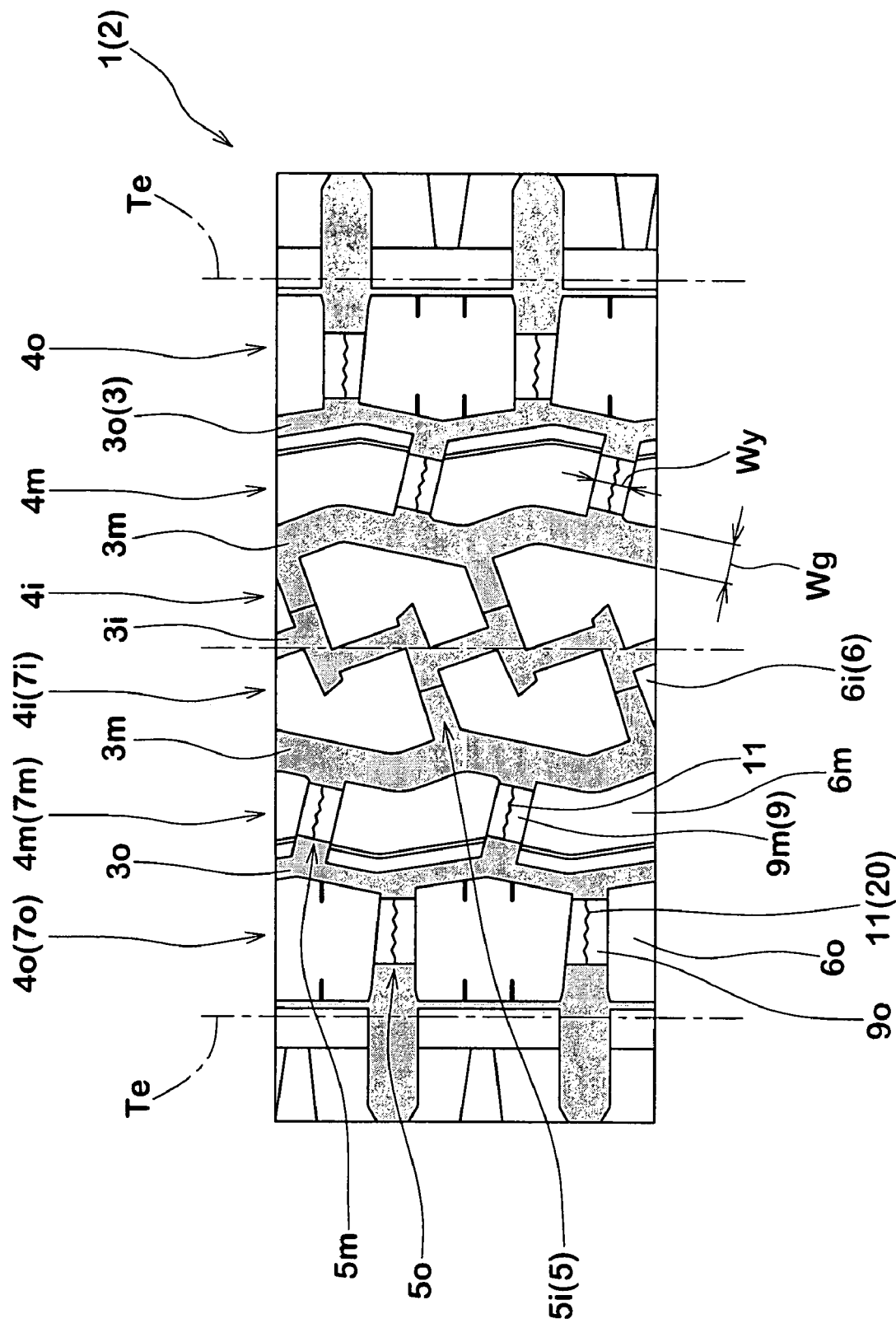
FIG. 1 is a development view showing an embodiment of a tread pattern in a pneumatic tire of the present invention.

An embodiment of the present invention will be explained together with illustrated examples. FIG. 1 is a development view showing a tread pattern when a pneumatic tire of the invention is a heavy load tire. In a pneumatic tire 1 shown in FIG. 1, a tread portion 2 is provided with circumferential main grooves 3 extending in the circumferential direction of the tire so that rib-like land portions 4 are formed between the circumferential main grooves 3 and 3, as well as between the circumferential main groove 3 and a tread edge (Te). At least one of the rib-like land portions 4 is provided with a lateral groove 5 which cuts across the rib-like land portion 4, thereby forming the rib-like land portions 4 into a block array 7 comprising blocks 6 arranged in the circumferential direction.

In this example, the circumferential main groove 3 comprises five grooves, i.e., a central circumferential main groove 3$i$ extending on the tire equator C, middle circumferential main grooves 3$m$ located opposite outer sides of the circumferential main groove 3$i$, and outer circumferential main grooves 3$o$ located further outer sides of the circumferential main grooves 3$m$. With this, the tread portion 2 is divided into six rib-like land portions 4, i.e., inner rib-like land portions 4$i$ between the circumferential main grooves 3$i$, 3$m$, middle rib-like land portions 4$m$ between the circumferential main"

grooves 3m, 3o, and outer rib-like land portions 4o between the circumferential main groove 3o and the tread edge (Te). The rib-like land portions 4i, 4m, 4o are formed as inner block arrays 7i comprising the blocks 6i, middle block arrays 7m comprising the blocks 6m, and outer block arrays 7o comprising the blocks 6o by the lateral grooves 5i, 5m, 5o.

Figure 2:
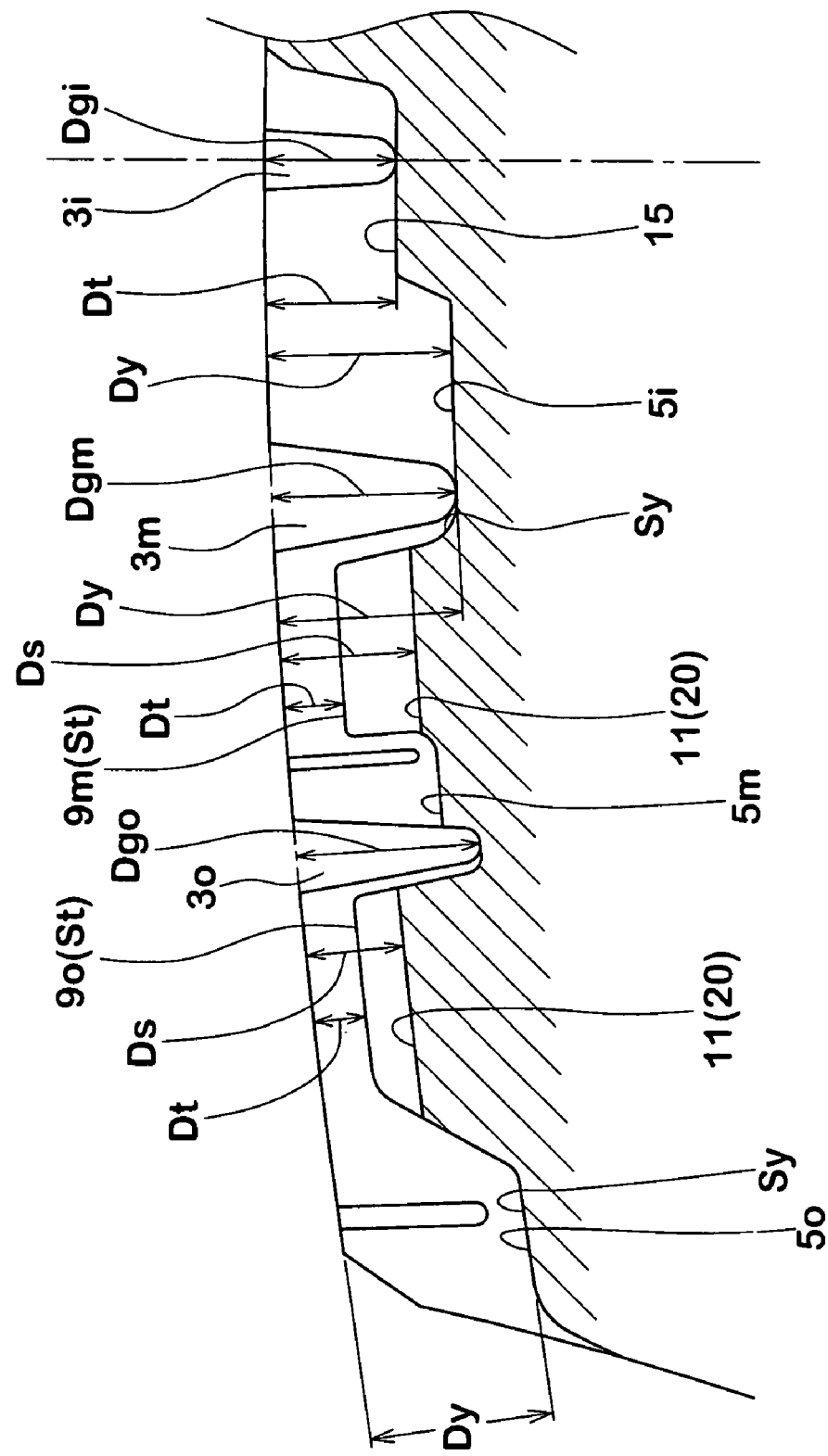
FIG. 2 is a sectional view of a tie bar provided in a bottom surface of a lateral groove taken along a lateral groove centerline.

The circumferential main groove 3 is a groove which continuously extend in the circumferential direction of the tire in a form of a straight line or a zigzag line, and its groove width (Wg) is 3.0 mm or more, preferably 5.0 mm or more. A groove depth (Dg) (shown in FIG. 2) is preferably set to 9 mm or more, further preferably 15 mm or more, in terms of grip performance on a snow road and a dirt road. In this example, groove depths (Dgm) and (Dgo) of the middle and outer circumferential main grooves 3m and 3o are set to values as slightly deep as 17 mm, and a groove depth (Dgi) of the central circumferential main groove 3i having high grounding pressure is set to a value as slightly shallow as 12 mm. The "groove width" means a groove width in a direction intersecting with a groove centerline at right angles as measured on the tread surface. The "groove depth" means a groove depth as measured from a phantom tread surface in a direction intersecting with a phantom tread surface at right angles.

The lateral groove 5 has a groove width (Wy) of 2.0 mm or wider, and inclines at an angle of 30° or less with respect to the axial direction of the tire, thereby securing the traction performance. The maximum groove depth (Dy) of the lateral groove 5 is 0.7 to 1.0 times (1.0 times in this example) the groove depth (Dg) of the circumferential main groove 3 which intersects with the lateral groove 5.

The middle and outer block arrays 7m and 7o exert large influence on cornering force and are required to have high block rigidity. In this example, the lateral grooves 5m and 5o of the middle and outer block arrays 7m and 7o are formed with tie bars 9m and 9o (collectively called a tie bar 9).

Figure 3:
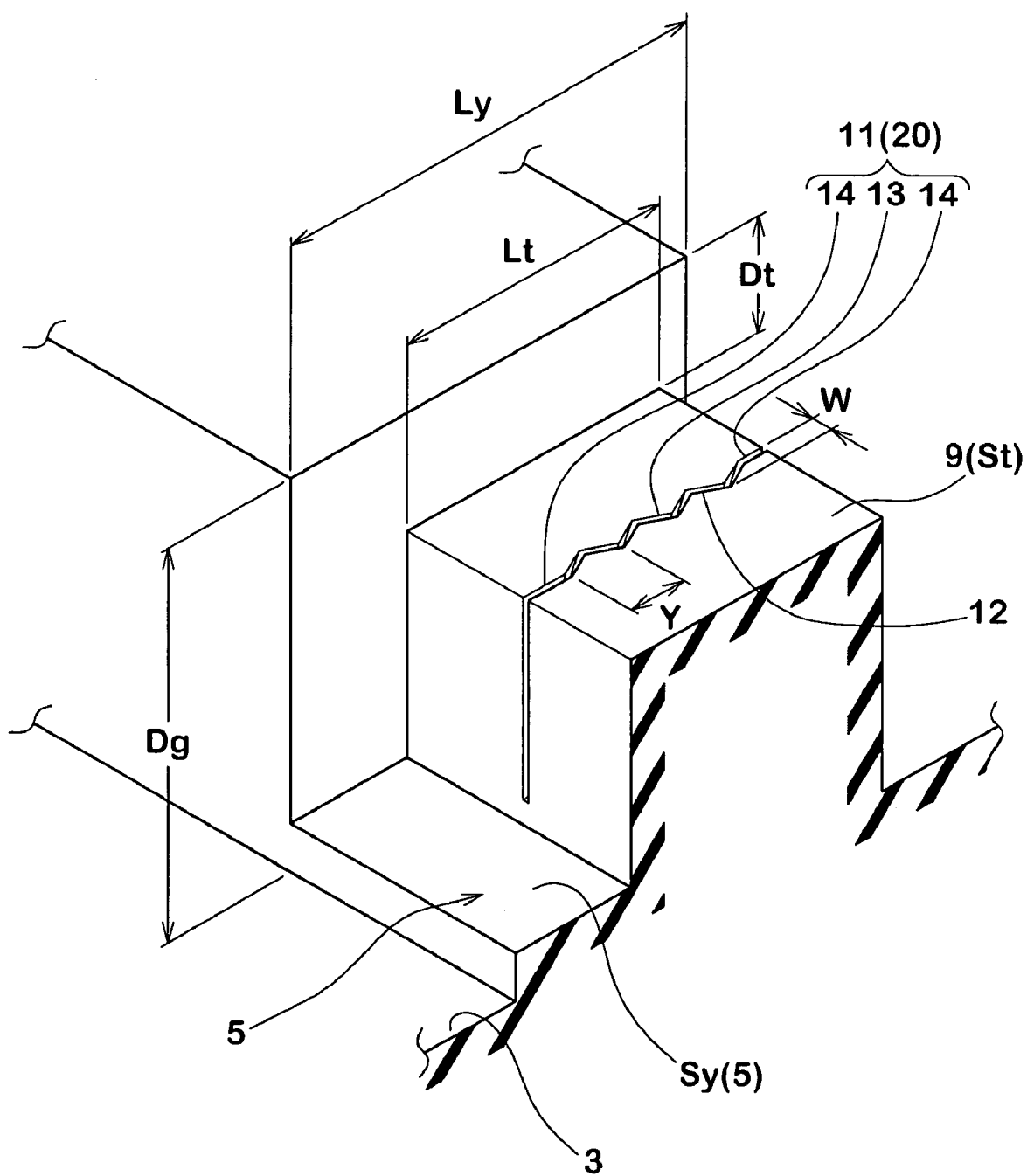
FIG. 3 is a schematic perspective view of the tie bar and the sipeing.

As schematically shown in FIG. 3, the tie bar 9 is a rib-like bar which swells from a lateral groove bottom surface (Sy) which forms the maximum groove depth of the lateral groove 5, and the tie bar 9 connects the circumferentially adjacent blocks to each other, thereby enhancing the block rigidity. A ratio Lt/Ly of a length (Ly) of the lateral groove 5 and a length (Lt) of the tie bar 9 along the lateral groove 5 is preferably in a range of 0.3 to 1.0. A ratio Dt/Dg of the tie bar depth (Dt) from the tread surface to the outer surface St of the tie bar 9 and the groove depth (Dg) of the circumferential main groove 3 with which the lateral groove 5 intersects is preferably in a range of 0.18 to 0.80. When the left and right circumferential main grooves 3 which intersect with the lateral grooves 5 have different groove depths (Dg), deeper one of groove depths (Dg) of the circumferential main grooves 3 is employed.

If the ratio Lt/Ly is smaller than 0.3 and if the ratio Dt/Dg is greater than 0.80, the enhancing effect of the block rigidity is insufficient, and uneven wear such as heel and toe wear can not sufficiently be suppressed. If the ratio Lt/Ly is greater than 1.0 and if the ratio Dt/Dg is smaller than 0.18, the groove capacity of the lateral groove 5 becomes excessively small, and the traction performance can not sufficiently be exhibited.

The tie bar 9 is formed with a sipeing 11. The sipeing 11 opens at the outer surface St, and its open edge shape 12 has a zigzag portion 13 extending in a zigzag form in a direction of the groove centerline of the lateral groove 5. In this example, the open edge shape 12 comprises a zigzag portion 13, and straight line portions 14 extending from opposite ends of the zigzag portion 13 in the groove centerline direction. The straight-line portion 14 may be provided only on one end of the zigzag portion 13, and the open edge shape 12 may comprise only the zigzag portion 13. The sipeing 11 of this example is of a so-called open type in which its both ends are opened at opposite sides of the tie bar 9, but may be of a one side open type in which only one of the ends is opened, or of a close type in which both the ends are closed in the tie bar.

The zigzag shape of the zigzag portion 13 may be bent lines which are bent in a form of V-shape as in this example, or may include curved arc lines, or corrugated lines comprising Sin curved lines. In order to highly secure the block rigidity and bending rigidity of a knife blade provided on a mold for forming the sipeing, the bent lines as in this example are preferable. It is preferable that the zigzag amplitude W (shown in FIG. 4) of the zigzag portion 13 is in a range of 1.5 to 4.5 mm, and the zigzag pitch Y in a centerline direction F is in a range of 2 to 6 times the amplitude W.

As the sipeing 11, there is employed a three-dimensional sipeing 20 in which the sipeing wall surface 11S is repeatedly recessed and projected three-dimensionally.

Figure 4A:
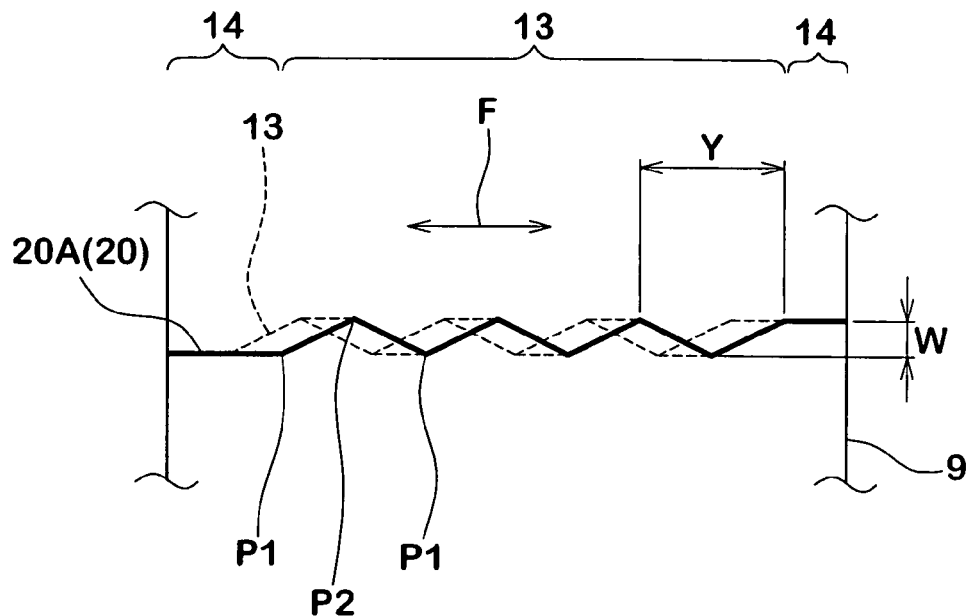
FIGS. 4(A) and 4(B) are plan view and front view showing one example of a three-dimensional sipeing, respectively.
Figure 4B:
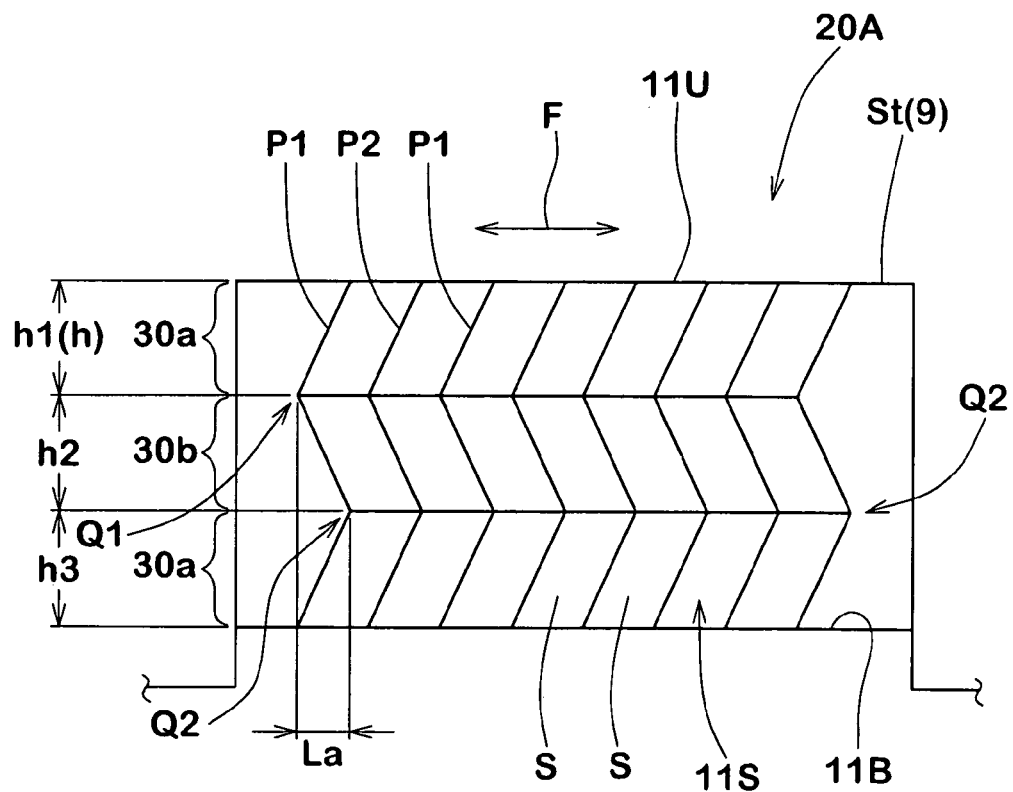

As shown in FIGS. 4(A) and 4(B), it is possible to suitably use a three-dimensional sipeing 20A in which the zigzag portion 13 is repeatedly displaced toward one side and the other side in a direction F of the zigzag centerline as the cross section moves from the sipeing upper end 11U toward the sipeing bottom 11B.

Figure 5A:
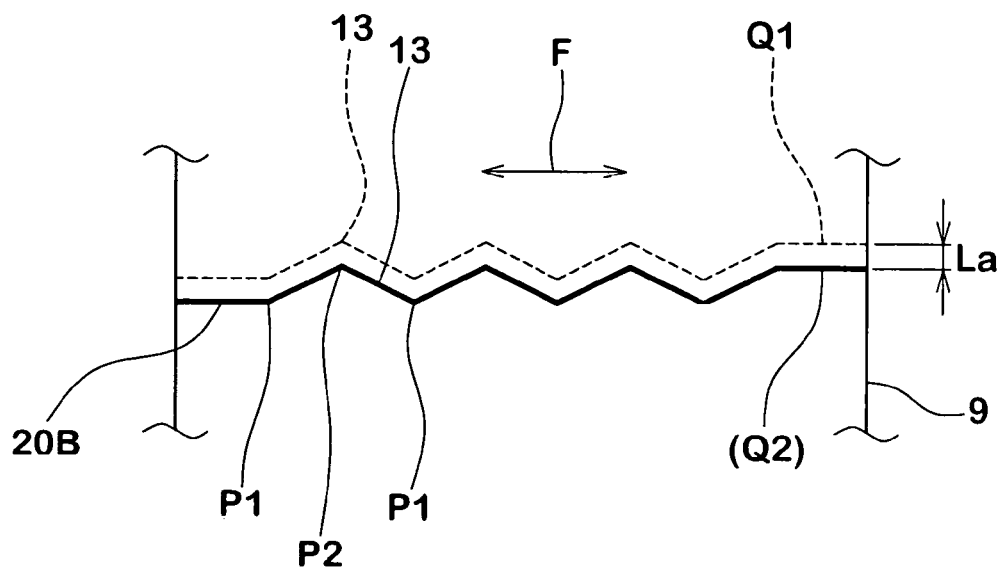
FIGS. 5(A) and 5(B) are plan view and front view showing another example of a three-dimensional sipeing, respectively.
Figure 5B:
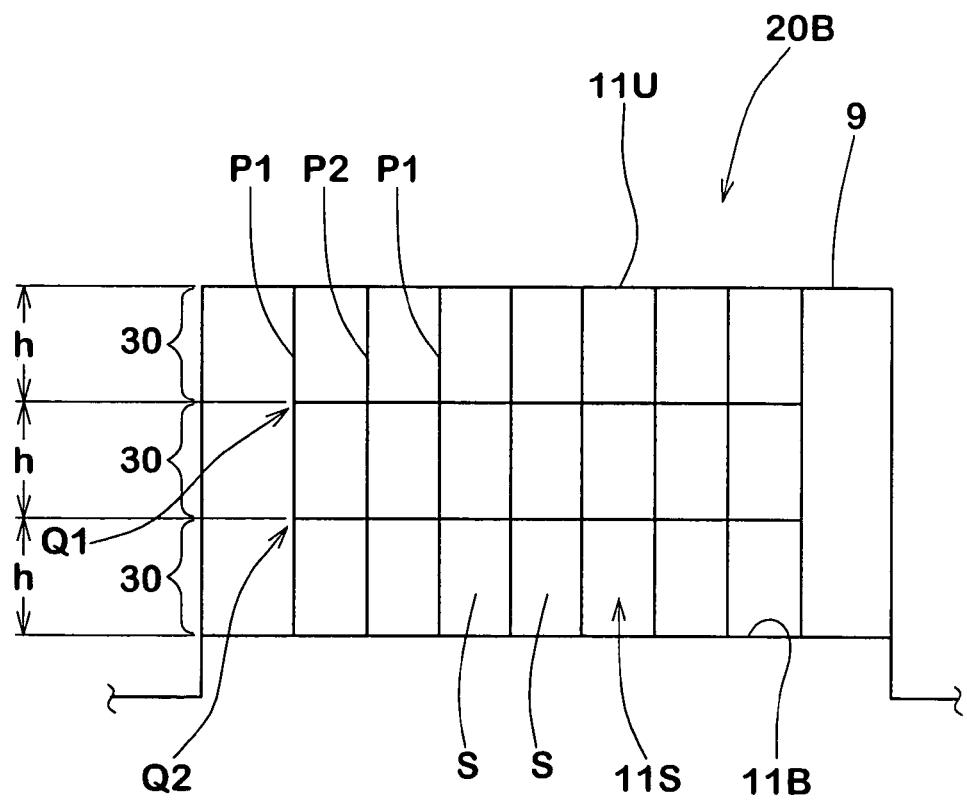
Figure 6A:
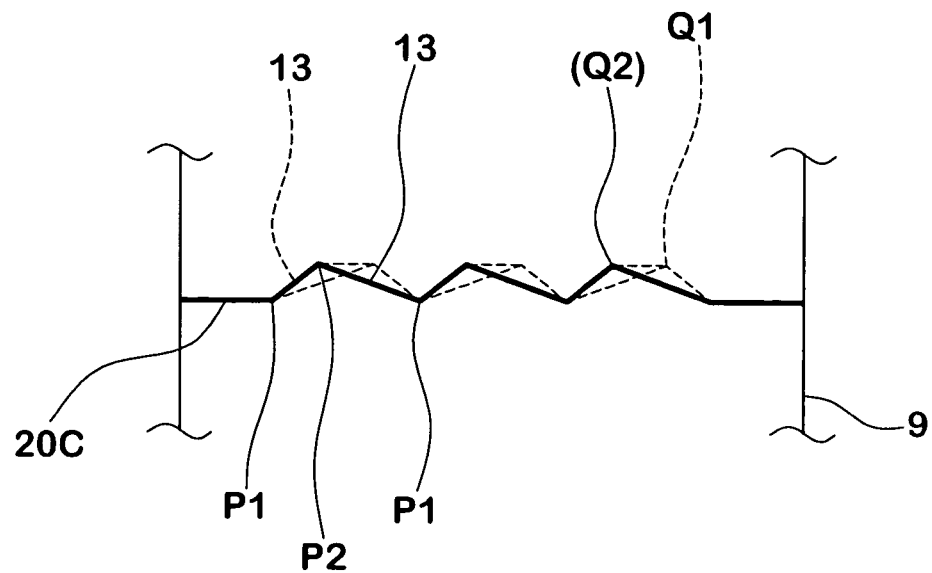
FIGS. 6(A) and 6(B) are plan view and front view showing another example of a three-dimensional sipeing, respectively.
Figure 6B:
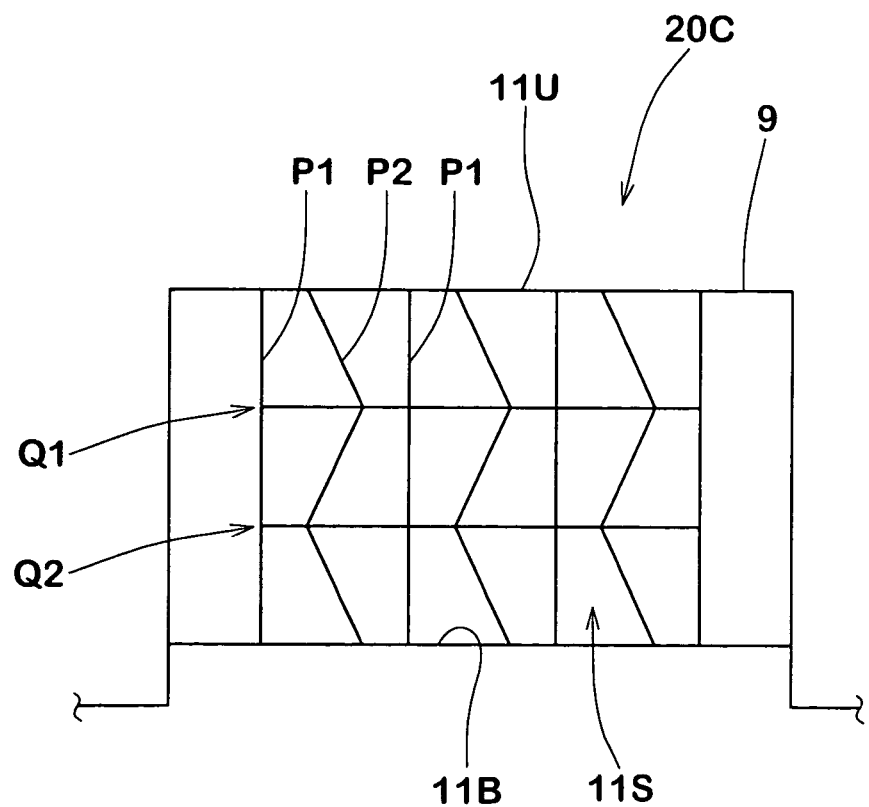

However, as shown in FIGS. 5(A) and 5(B), it is also possible to use a three-dimensional sipeing 20B in which the zigzag portion 13 is repeatedly displaced toward one side and the other side in a direction different from the direction F of the zigzag centerline (e.g., direction perpendicular to the direction F) as the cross section moves from the sipeing upper end 11U toward the sipeing bottom 11B. As shown in FIGS. 6(A) and 6(B), it is also possible to use a three-dimensional sipeing 20C (FIG. 6) in which a length of each segment of the zigzag is repeatedly varied as the cross section moves from the sipeing upper end 11U toward the sipeing bottom 11B. FIGS. 4 to 6 are abstracted plane views and front views of the sipeing 11, and symbols P1 and P2 in the drawings show edge lines of mountains and valleys of the zigzag portion 13.

In the three-dimensional sipeing 20A shown in FIGS. 4(A) and 4(B), the zigzag portion 13 comprises zigzag displacement portion 30a which is displaced toward one side of the centerline direction F and zigzag displacement portion 30b which is displaced toward the other side as the cross section moves from the sipeing upper end 11U toward the sipeing bottom 11B. At that time, the zigzag shape itself of the zigzag portion 13 is the same at any depth position.

More specifically, as shown in FIG. 4(B), the edge lines P1, P2 of mountains and valleys are displaced toward one side (leftward in the drawing) in the centerline direction F as the depth from the outer surface St is increased. Then, the edge lines P1, P2 change the direction at a first displacement position Q1 and are displaced toward the other side (rightward in the drawing) in the centerline direction F up to a second displacement position Q2. At that time, the edge lines P1, P2 are in parallel to each other as they extend from the sipeing upper end 11U to the sipeing bottom 11B. In this example, the displacement toward the one side and the other side in the centerline direction F is repeated in succession.

Figure 7:
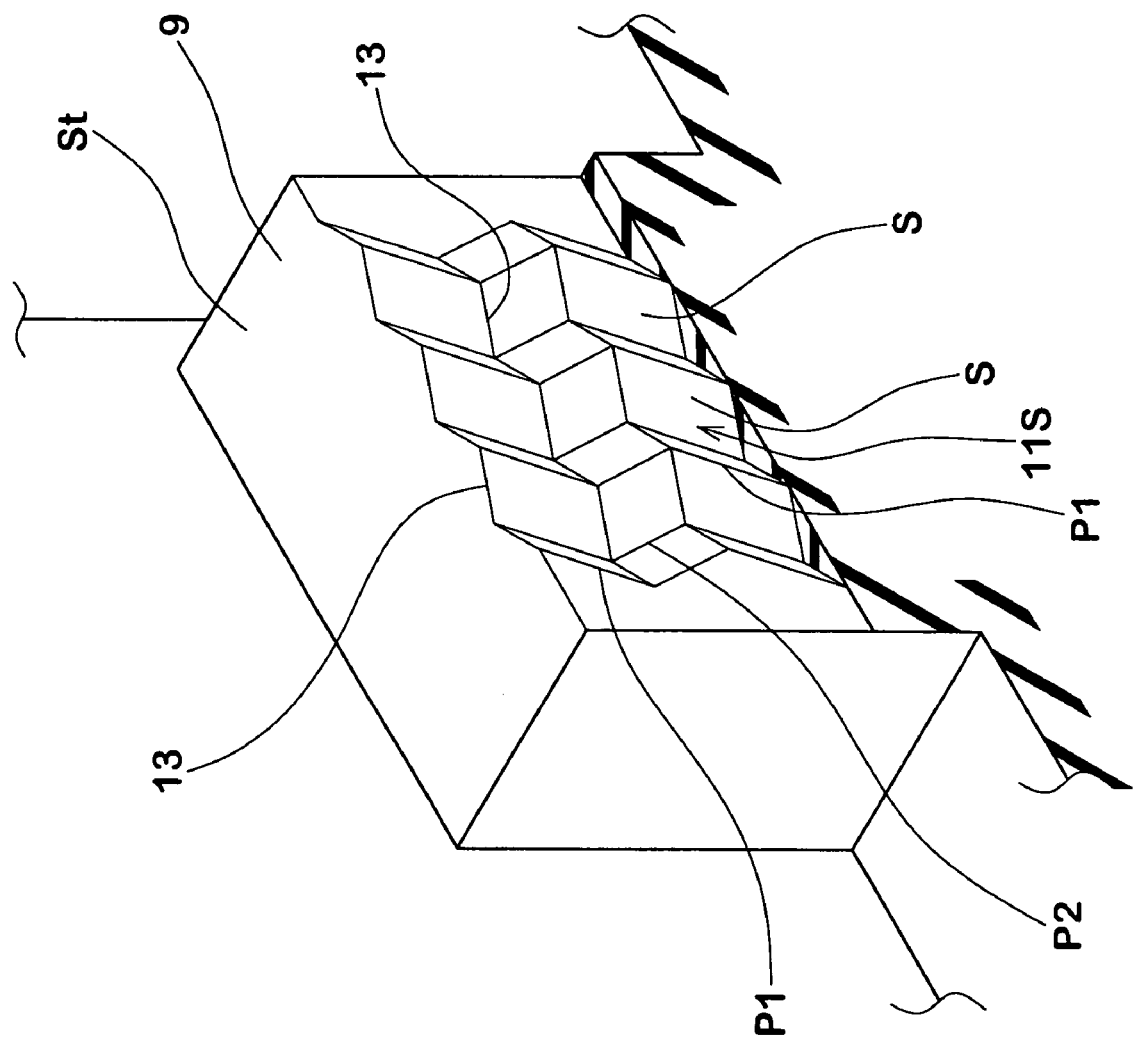
FIG. 7 is a perspective view showing a sipeing wall surface.

According to the three-dimensional sipeing 20A having such a structure, as shown in FIG. 7, the sipeing wall surface 11S is formed into a stereoscopic curved surface in which a plurality of parallelogram surfaces S are combined, and recessed portions and projected portions are repeated three-dimensionally. Therefore, opposed sipeing wall surfaces 11S can support each other in such a manner that the recessed portions and projected portions mesh with each other, and can exhibit high resistance force not only against the circumferential direction force but also against the lateral force. With this, it is possible to effectively suppress the motion of the tie bar, especially the motion in the lateral direction. As a result, it is possible to minimize the generation of distortion at the sipeing bottom, and to prevent generation of crack from the sipeing bottom.

In order to prevent a crack from being generated, it is preferable that a sipeing depth (Ds) (shown in FIG. 2) of the sipeing 11 from the tread surface is smaller than a groove depth (Dg) of the circumferential main groove 3 which intersects with the lateral groove 5. When the left and right circumferential main grooves 3 which intersect with the lateral grooves 5 have different groove depths (Dg), deeper one of groove depths (Dg) of the circumferential main grooves 3 is employed.

The tie bar 9 is exposed to the tread surface in the middle stage of wear, but the sipeing 11 is also exposed at the same time, and the edge effect is exhibited. As a result, it is possible to highly maintain the on-snow performance and wet performance from the middle to end stage of wear. For this purpose, it is preferable that the sipeing depth (Ds) of the sipeing 11 from the tread surface is 36% or higher, more preferably 45% or higher of the groove depth (Dg).

In the three-dimensional sipeing 20A, the displacement amount La in the centerline direction F (shown in FIGS. 4) is 0.5 to 3.0 mm. If the amount is less than 0.5 mm, the meshing of recessed portion and projected portion between the opposed sipeing wall surfaces 11S is insufficient and motion-suppressing effect of the block becomes insufficient. If the amount exceeds 3.0 mm, the resistance generated when the knife blade is pulled out from the tire becomes large, and the productivity is deteriorated. Thus, it is more preferable that the displacement amount La is in a range of 0.5 to 2.0 mm. At least one, preferably two to three displacement positions Q are provided. A height (h) of each of the zigzag displacement portions 30a, 30b, i.e., a height (h1) from the sipeing upper end 11U to the displacement position Q1, and a height (h2) between the displacement folded back positions Q1, Q2, and a height (h3) from the displacement position Q2 to the sipeing bottom 11B are preferably in a range of 1.0 to 3.0 times the displacement amount La.

In this example, the displacement amounts La of the zigzag displacement portions 30a, 30b are equal to each other, and the heights (h) of the zigzag displacement portions 30a, 30b are equal to each other.

Figure 8A:
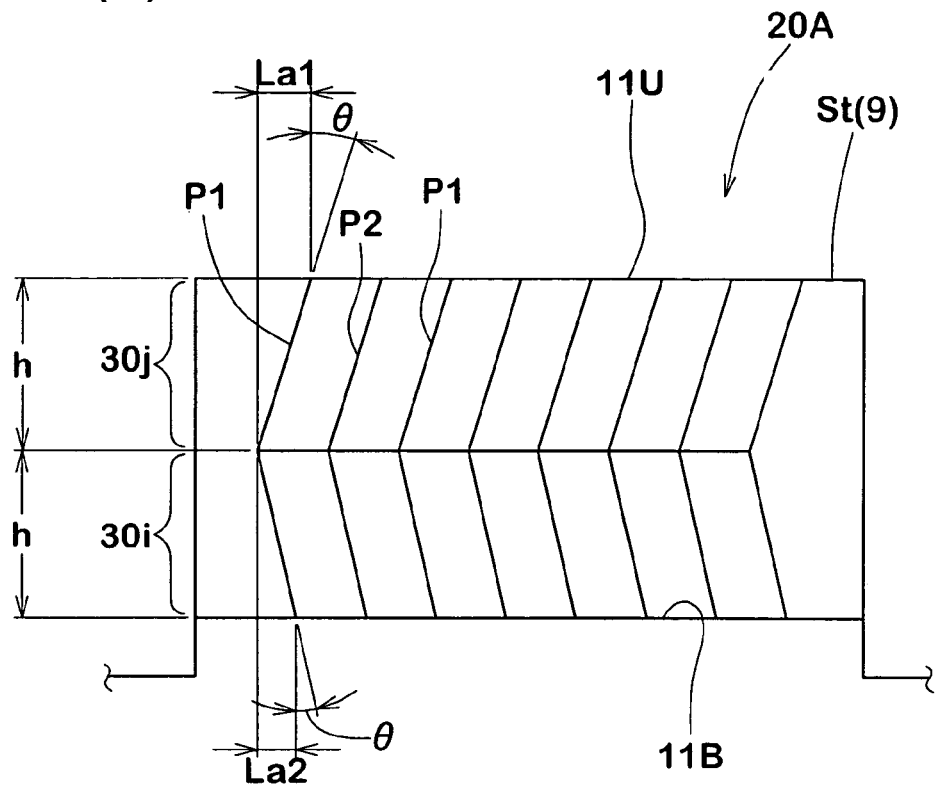
FIGS. 8(A) and 8(B) are front views showing another example of the three-dimensional sipeing.
Figure 8B:
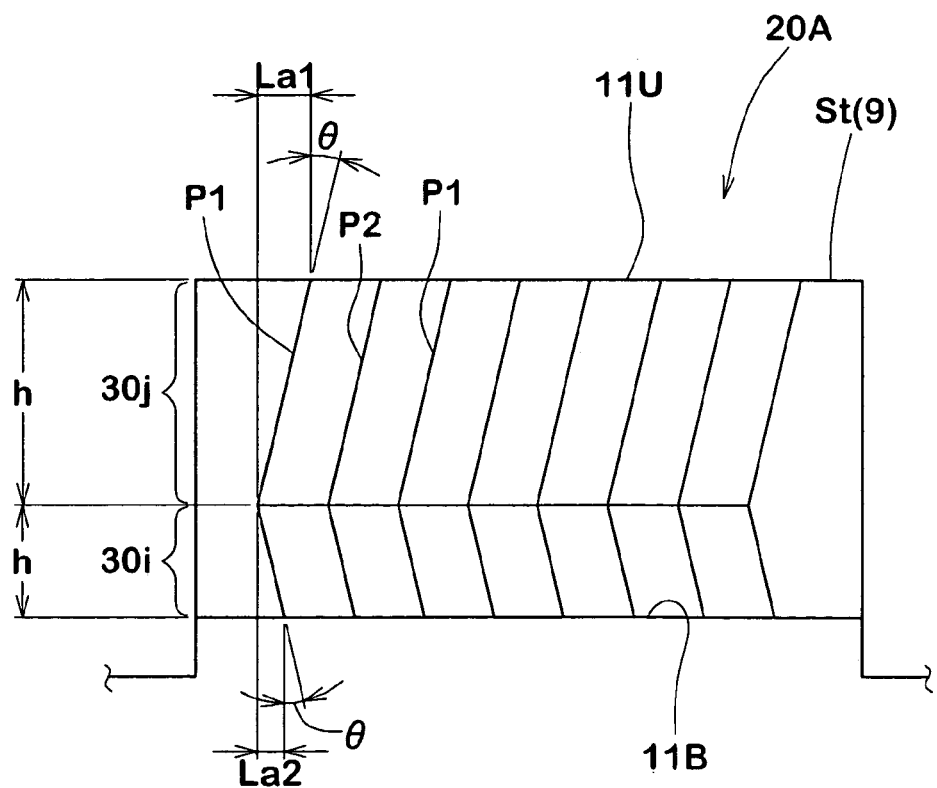

However, as shown in FIGS. 8(A) and 8(B), it is preferable that a displacement amount (La2) of the lowermost zigzag displacement portion 30i is smaller than a displacement amount (La1) of an uppermost zigzag displacement portion 30j because the pulling out resistance of the knife blade is reduced while maintaining the merit of the three-dimensional sipeing. This is because that as the zigzag displacement portion 30 is closer to the sipeing bottom 11B, the motion-suppressing effect of the tie bar 9 is weaker, and influence exerted on the pulling out resistance of the knife blade is stronger. In FIG. 8(A), the heights (h) of the zigzag displacement portions 30i, 30j are equal to each other, and the inclination angle θ (i.e., ratio of displacement) with respect to the depth direction line of each of the edge lines P1, P2 is different between the lowermost zigzag displacement portion 30i and the uppermost zigzag displacement portion 30j. In FIG. 8(B), the inclination angles θ are equal to each other, and the heights are different between the lowermost zigzag displacement portion 30i and the uppermost zigzag displacement portion 30j. When there exists the zigzag displacement portion 30m between the lowermost zigzag displacement portion 30i and the uppermost zigzag displacement portion 30j, the displacement amount (La) of the zigzag displacement portion 30m is equal to or greater than the displacement amount (La2) and equal to or smaller than the displacement amount (La1) Thus, the displacement amount (La2) of the zigzag displacement portion disposed at the lowermost side is smaller than the displacement amount (La1) of the zigzag displacement portion disposed at the uppermost side; ratios (La/h) of the displacement amount (La) to the depth (h) of the zigzag displacement portions are equal to each other, and the depth (h) of the displacement portion disposed at the lowermost side is smaller than the depth (h) of the zigzag displacement portion disposed at the uppermost side.

Next, in the case of the three-dimensional sipeing 20B shown in FIGS. 5, like the three-dimensional sipeing 20A, the zigzag shape itself of the zigzag portion 13 is the same at any of depth positions. However, this case is characterized in that the zigzag portion 13 is alternately and repeatedly displaced toward the one side and the other side of in the direction different from the centerline direction F (direction perpendicular to the direction F) by the displacement amount La from the sipeing upper end 11U toward the sipeing bottom 11B. Like the three-dimensional sipeing 20A, according to the three-dimensional sipeing 20B, the sipeing wall surface 11S is also formed into a stereoscopic curved surface having three-dimensional recessed portion and projected portion. Therefore, it is possible to suppress the block motion especially in the lateral direction. The displacement amount (La) and the height (h) of the zigzag displacement portion 30 are the same as those of the three-dimensional sipeing 20A. Like the three-dimensional sipeing 20A, it is preferable that the displacement amount La of the lowermost zigzag displacement portion 30 is smaller than the displacement amount (La) of the uppermost zigzag displacement portion 30.

Next, the three-dimensional sipeing 20C shown in FIGS. 6(A) and 6(B) is characterized in that the zigzag shape itself of the zigzag portion 13 is varied in the depth direction. Likewise, according to the three-dimensional sipeing 20C, the sipeing wall surface 11S is also formed into a stereoscopic curved surface having three-dimensional recessed portion and projected portion. However, as compared with other three-dimensional sipeings 20A and 20B, since the variations between recessed portions and projected portions are small, there is a drawback that the motion suppressing effect of the block is inferior.

Next, in this example, a low tie bar 15 (shown in FIG. 2) is formed in the lateral groove 5i. However, the tie bar depth (Dt) of the tie bar 15 is substantially equal to the groove depth (Dg) of the middle circumferential main groove 3i and is as deep as 65 to 80% of the groove depths (Dg) of the circumferential main grooves 3m, 3o. Thus, in the end stage of wear also, the tie bar is not exposed to the tread surface and thus, the tie bar 15 is not formed with the sipeing 11.

Although especially preferred embodiment of the present invention has been described in detail, the invention is not limited to the illustrated examples, and the invention can variously be deformed. For example, the invention can be applied to tires of other categories such as a passenger vehicle tire, a two-wheel vehicle tire or a summer tire other than winter tire.

EXAMPLES

Based on the tread pattern shown in FIG. 1, heavy load radial tires (tire size: 11R22.5-14PR) each having a tie bar provided with a sipeing of a specification shown in Table 1 were prototyped. Wet performance and a crack generation state in the sipeing bottom were tested for a new prototyped tire and 50% worn tire. Specifications of the tires other than sipeing were the same.

(1) Wet Performance:

The prototyped tires were mounted on all wheels of a 2-D.4 test vehicle (having an anti-lock brake system) under conditions of rim (7.50×22.5) and internal pressure (850 kPa). The vehicle was allowed to run on a wet road in a state in which a constant load (ten tons) was applied, and a braking distance required until the vehicle stopped after applying abrupt brake from 60 km/h was measured. Reciprocals of measured values are indicated with indices while a comparative example 1 is defined as 100. This test was carried out for the new tire and the 50% worn tire. The greater the value, the more excellent the result is.

(2) Crack Generation State:

The prototyped tires were mounted on all wheels of a 2-2-D truck, the truck was allowed to run 150,000 km on an ordinary road and then, presence or absence of a crack in a sipeing bottom was checked. When cracks were generated, the average length of the cracks was obtained.

TABLE 1

|  | Example 1 | Comparative Example 1 | Comparative Example 2 |
|---|---|---|---|
| Sipeing | Presence | Presence | Absence |
| Shape | Three-dimensional (FIG. 4) | Flat surface | — |
| Depth Ds (mm) | 13 | 13 | — |
| (Ratio Ds/Dg) | (0.74) | (0.74) | — |
| Amplitude W of zigzag (mm) | 2.0 | — | — |
| Zigzag pitch Y (mm) | 7.5 | — | — |
| Displacement amount La (mm) | 1.8 | — | — |
| Height h (mm) | 3.6 | — | — |
| Wet performance |  |  |  |
| New tire | 100 | 100 | 100 |
| 50% worn tire | 103 | 100 | 95 |
| Crack generation state | Absence (0 mm) | Presence (3.0 mm) | Absence (0 mm) |

As shown in Table 1, according to the tire of the example of the present invention, it can be confirmed that generation of crack in the sipeing bottom can effectively be suppressed while wet performance when the tire was worn by 50% is highly exhibited.

What is claimed is:

1. A pneumatic tire comprising a tread portion, and a plurality of fib-like land portions divided by circumferential main grooves extending in a circumferential direction of the tire, in which at least one rib-like land portion is divided into a plurality of blocks arranged in the circumferential direction by lateral grooves which cut across the rib-like land portion, wherein the lateral grooves provided with tie bars which extend from a bottom surface of the lateral groove and which connects circumferentially adjacent blocks to each other, the tie bar is formed with a sipeing which opens at an outer surface of the tie bar and which comprises a zigzag portion extending in a direction of a groove centerline of the lateral groove in a zigzag manner, said zigzag portion of the sipeing provides an identical shape in any cross section parallel to the outer surface of the tie bar, and the zigzag portion is displaced by a displacement amount (La) toward one side and the other side in a direction of the zigzag centerline as the cross section moves from an upper end to a bottom of the sipeing so as to form zigzag displacement portions, a displacement amount (La2) of the zigzag displacement portion disposed lowermost side is smaller than a displacement amount (La1) of the zigzag displacement portion disposed uppermost side, depths (h) of the zigzag displacement portions are equal to each other, and ratio (La/h) of the displacement amount (La) to the depth (h) of the zigzag displacement portion disposed lowermost side is smaller than the ratio (La/h) of the displacement amount (La) to the depth (h) of the zigzag displacement portion disposed uppermost side.

2. A pneumatic tire comprising a tread portion, and a plurality of rib-like land portions divided by circumferential main grooves extending in a circumferential direction of the tire, in which at least one rib-like land portion is divided into a plurality of blocks arranged in the circumferential direction by lateral grooves which cut across the rib-like land portion, wherein the lateral grooves provided with tie bars which extend from a bottom surface of the lateral groove and which connects circumferentially adjacent blocks to each other, the tie bar is formed with a sipeing which opens at an outer surface of the tie bar and which comprises a zigzag portion extending in a direction of a groove centerline of the lateral groove in a zigzag manner, said zigzag portion of the sipeing provides an identical shape in any cross section parallel to the outer surface of the tie bar, and the zigzag portion is displaced by a displacement amount (La) toward one side and the other side in a direction of the zigzag centerline as the cross section moves from an upper end to a bottom of the sipeing so as to form zigzag displacement portions, a displacement amount (La2) of the zigzag displacement portion disposed at the lowermost side is smaller than a displacement amount (La1) of the zigzag displacement portion disposed at the uppermost side, ratios (La/h) of the displacement amount (La) to the depth (h) of the zigzag displacement portions are equal to each other, and the depth (h) of the zigzag displacement portion disposed lowermost side is smaller than the depth (h) of the zigzag displacement portion disposed uppermost side.

3. A pneumatic tire comprising a tread portion, containing five circumferential main grooves extending in a circumferential direction of the tire, and a plurality of lateral grooves, wherein said five circumferential main grooves consist of a center main groove located on the tire equator, two middle main grooves located on opposite sides of the center main groove, and two outer main grooves located on opposite sides of the middle main grooves, respectively, the plurality of lateral grooves defining land portions between the center main groove and the middle main groove into a block array of inner blocks, lateral grooves defining land portions between the middle main groove and the outer main groove into a block array of middle blocks, and lateral grooves defining land portions between the outer main groove and a tread edge into a block array of outer blocks, each of said block arrays being provided with tie bars extending from a bottom surface of the lateral grooves and connecting the circumferentially adjacent blocks to each other, the groove depth of the center main groove from a tread surface is smaller than the groove depth of the other main grooves from the tread surface, and equal to the depth of the tie bar from the tread surface provided to the block array of the inner blocks, only the tie bars provided to the block arrays of the middle blocks and the block arrays of the outer blocks are formed with a sipeing which opens at an outer surface of the tie bar and which comprises a zigzag portion extending in a direction of a groove centerline of the lateral groove, in a zigzag manner, and the sipeing comprises a three-dimensional sipeing whose wall surface is repeatedly recessed and projected, three-dimensionally, said zigzag portion of the sipeing provides an identical shape in any cross section parallel to the outer surface of the tie bar, and the zigzag portion is displaced by a displacement amount (La) toward one side and the other side in a direction of the zigzag centerline as the cross section moves from an upper end to a bottom of the sipeing so as to form zigzag displacement portions, a displacement amount (La2) of the zigzag displacement portion disposed at the lowermost side is smaller than a displacement amount (La1) of the zigzag displacement portion disposed at the uppermost side, depths (h) of the zigzag displacement portions are equal to each other, and a ratio (La/h) of the displacement amount (La) to the depth (h) of the zigzag displacement portion disposed at the lowermost side is smaller than the ratio (La/h) of the displacement amount (La) to the depth (h) of the zigzag displacement portion disposed at the uppermost side.

4. The pneumatic tire according to claim 1, wherein an amplitude (W) of the zigzag shape of the zigzag portion is 1.5 to 4.5 mm, and a zigzag pitch (Y) of the zigzag portion in a direction of the centerline is 2 to 6 times the amplitude (W).

5. The pneumatic tire according to claim 1, wherein the three-dimensional sipeing opens at both ends of the tie bar, and a depth (Ds) of the sipeing from a tread surface is smaller than a groove depth (Dg) of the circumferential main groove.

6. The pneumatic tire according to claim 1, wherein a wall surface of the sipeing is formed of a plurality of parallelogram surfaces.

7. The pneumatic tire according to claim 1, wherein the depth of the tie bar provided to the block array of the inner blocks is greater than the depth of the tie bar provided to the block array of the middle blocks and larger than the depth of the tie bar provided to the block array of the outer blocks.

8. The pneumatic tire of claim 1, wherein a ratio of a length of the lateral groove and the length of the tie bar having sipeing along the lateral groove falls within the range of 0.3 to 1.0.

9. The pneumatic tire of claim 1 wherein the ratio of the tie bar depth for the tie bar having the sipeing from the tread surface to the outer surface of the tie bar and the grooved depth of the circumferential main groove with which the lateral groove intersects falls within the range of 0.18 to 0.80.

10. A pneumatic tire comprising a tread portion containing five circumferential main grooves extending in a circumferential direction of the tire, and a plurality of lateral grooves, wherein said five circumferential main grooves consist of
a center main groove located on the tire equator,
two middle main grooves located on opposite sides of the center main groove, and
two outer main grooves located on opposite sides of the middle main grooves, respectively, the plurality of lateral grooves defining land portions between the center main groove and the middle main groove into a block array of inner blocks,
lateral grooves defining land portions between the middle main groove and the outer main groove into a block array of middle blocks, and
lateral grooves defining land portions between the outer main groove and a tread edge into a block array of outer blocks, each of said block arrays being provided with tie bars extending from a bottom surface of the lateral grooves and connecting the circumferentially adjacent blocks to each other, the groove depth of center main groove from a tread surface is smaller than the groove depth of the other main grooves from a tread surface, and equal to the depth of the tie bar from the tread surface provided to the block array of the inner blocks, only the tie bars provided to the block arrays of the middle blocks and the block arrays of the outer blocks are formed with a sipeing which opens at an outer surface of the tie bar and which comprises a zigzag portion extending in a direction of a groove centerline of the lateral groove in a zigzag manner, said zigzag portion of the sipeing provides an identical shape in any cross section parallel to the outer surface of the tie bar, and the zigzag portion is displaced by a displacement amount (La) toward one side and the other side in a direction of the zigzag centerline as the cross section moves from an upper end to a bottom of the sipeing so as to form zigzag displacement portions, a displacement amount (La2) of the zigzag displacement portion disposed at the lowermost side is smaller than a displacement amount (La1) of the zigzag displacement portion disposed at the uppermost side, ratios (La/h) of the displacement amount (La) to the depth (h) of the zigzag displacement portions are equal to each other, and the depth (h) of the zigzag displacement portion disposed at the lowermost side is smaller than the depth (h) of the zigzag displacement portion disposed at the uppermost side.

* * * * *